United States Patent
Garcia Freitas et al.

(10) Patent No.: US 11,259,005 B1
(45) Date of Patent: Feb. 22, 2022

(54) METHOD FOR COMPRESSING LIGHT-FIELD DATA

(71) Applicant: SAMSUNG ELETRÔNICA DA AMAZÔNIA LTDA., São Paulo (BR)

(72) Inventors: Pedro Garcia Freitas, Campinas-São Paulo (BR); Ismael Seidel, Campinas-São Paulo (BR); Renam Castro Da Silva, Campinas-São Paulo (BR); Vanessa Testoni, Campinas-São Paulo (BR)

(73) Assignee: SAMSUNG ELECTRÔNICA DA AMAZÔNIA LTDA., Campinas (BR)

( * ) Notice: Subject to any disclaimer, the term of this patent is extended or adjusted under 35 U.S.C. 154(b) by 0 days.

(21) Appl. No.: 17/229,205

(22) Filed: Apr. 13, 2021

(30) Foreign Application Priority Data

Jan. 22, 2021 (BR) .................. 10 2021 001287 0

(51) Int. Cl.
*H04N 13/161* (2018.01)
*H04N 13/15* (2018.01)
*H04N 13/00* (2018.01)

(52) U.S. Cl.
CPC .......... *H04N 13/161* (2018.05); *H04N 13/15* (2018.05); *H04N 2013/0081* (2013.01)

(58) Field of Classification Search
None
See application file for complete search history.

(56) References Cited

U.S. PATENT DOCUMENTS

| 10,136,116 | B2 * | 11/2018 | Tosic ................. G06T 7/11 |
| 2015/0201176 | A1 | 7/2015 | Graziosi et al. |
| 2017/0280136 | A1 | 9/2017 | Liang |

FOREIGN PATENT DOCUMENTS

| CN | 106534853 | 3/2017 |
| WO | 2019/036794 | 2/2019 |

OTHER PUBLICATIONS

Ioan Tabus, et al., "Lossy Compression of Lenslet Images From Plenoptic Cameras Combining Sparse Predictive Coding and JPEG 2000", Sep. 17, 2017, 5 pages.

* cited by examiner

*Primary Examiner* — Christopher Braniff (57) ABSTRACT

The present invention relates to a method for compressing light-fields by exploiting their overall 4D redundancy using a hybrid approach that combines the benefits of sparse coding approach with pseudo-video sequence or multi-view coding to explore the inter-SAI redundancy and achieves very competitive results. This redundancy is particularly high when the light-fields are densely sampled. Therefore, this invention is especially efficient for densely sampled light-fields, such as the ones acquired by light-field cameras.

7 Claims, 9 Drawing Sheets

METHOD FOR COMPRESSING LIGHT-FIELD DATA

CROSS-REFERENCE TO RELATED APPLICATION(S)

This application is based on and claims priority under 35 U.S.C. § 119 to Brazilian Patent Application No. BR 10 2021 001287 0, filed on Jan. 22, 2021, in the Brazilian Intellectual Property Office, the disclosure of which is incorporated by reference herein in its entirety.

TECHNICAL FIELD

The present invention relates encoding light-field data by using existing video encoders, which can favor the rapid adoption of light-field technology since it may reuse many implemented technologies already available in mobile devices, such as video codec hardware. The present invention adds value to any device that employs light fields imaging resources in several areas, such as immersive displays, holographic smartphones, cameras, headsets, AR/VR/MR devices, smartTVs, etc.

The proposed method removes redundant information of light-field data, by reducing the number of bits to represent it and, therefore making the light-field data more suitable for transference through a limited-bandwidth medium.

BACKGROUND

Light-field is among the most efficient ways of representing the 3D naturalness of reality. It has become a great trend for being used in many images' applications, including high-resolution microscopy, computer vision, velocimetry, health, and much more.

Moreover, given that light-fields can capture the intensity of objects and record information of light rays, a generation of a massive amount of data occurs during light-field imaging, which implies in a large storage consumption. Therefore, the development of new efficient methods to compress light-fields data is extremely required. Not only these methods must be efficient, in terms of reducing information sent and stored, but they also need to achieve this efficiency while maintaining high visual quality since this will be important for the final user of the related light-fields applications.

Patent document WO2019036794, entitled "Layered scene decomposition codec system and methods", published on Feb. 28, 2019, by Hamilton Matthew, describes a method to compress light-fields that divide the light-field data into layers according to depth. On the other hand, the present invention decomposes the light-field spatially, generating different information sets. The first set, entitled "reference set", comprises some light-field Sub-Aperture Images (SAI) that are used as input in a SAI-synthesis algorithm. The second set, entitled "dismantled set", comprises the light-field SAIs discarded during the encoding process. The SAI-synthesis algorithm uses the SAIs in "reference set" to estimate the SAIs in the "dismantled set". The differences between the predicted and the original "dismantled set" are called "residual SAIs". The original and residual SAIs are transformed into two independent pseudo video sequences that are compressed using a video encoder.

Patent document US2017280136, entitled "Predictive Light-Field Compression", published on Sep. 28, 2017, by LYTRO INC., describes the compression of light-field data by exploiting redundancy based refocus operations. In this way, the light-field is represented as a plurality of redirected two-dimensional (2D) images. However, the present invention decomposes the light-field spatially, generating different information sets which results in two independent pseudo video sequences that are compressed using a video encoder.

Patent document CN106534853, entitled "Light-field image compression method based on hybrid scanning sequence", published on Mar. 22, 2017, by University of Science & Technology of China, describes a technique for SAI scanning in the bi-dimensional (2D) light-field SAI space. This scanning is called "hybrid" because it combines a "zigzag" scanning with a U-scanning. Using this hybrid scanning strategy, the light-field SAIs are arranged in a pseudo-sequence that is encoded using an ordinary video encoder. In contrast, this invention decomposes the light-field spatially, generating different information sets which results in two independent pseudo video sequences that are compressed using a video encoder. Moreover, CN106534853 uses "hybrid" in terms of scanning, while the present invention is "hybrid" in terms of sub-aperture image coding.

Patent document US20150201176, entitled "Methods for Full Parallax Compressed Light Field 3D Imaging Systems", published on Jul. 16, 2015, by Ostendo Technologies INC., describes a method to compress light-field data using depth-image based rendering (DIBR), enabled by a selected set of reference SAIs, depth maps and SAI synthesis through warping schemes. The approach used by Patent US20150201176A1 adopts a sparse coding approach, where some sub-aperture images are discarded in the encoder site and then predicted during the decoding process. However, the present invention adopts a hybrid of sparse coding with pseudo-sequence approach, where some sub-apertures are discarded but the residual between the original and the predicted is kept so the reconstruction may be more accurate.

The paper "Lossy Compression of Lenslet Images from Plenoptic Cameras Combining Sparse Predictive Coding and JPEG 2000", published on Sep. 17, 2017, by I. Tabus, P. Helin, P. Astola, describes a method to compress light-field data enabled by selected reference views, disparity maps and view synthesis using a warping scheme that is refined by four-dimensional sparse predictors. The main difference is that the present invention does not rely on either depth maps or view synthesis.

However, the present invention provides a method for coding light field data that can be represented as a 4-D signal, wherein each image represents the 3-D scene mapped onto a 2-D viewpoint of a matrix of viewpoints. The method decomposes the whole 4-D data into two sets and mix a hybrid approach of pseudo-sequence video coding with inter sub-aperture images (SAIs) prediction. In other methods, a sequence of sub-aperture images can be directly encoded by a video codec, or some sub-aperture images are chosen as references while others are synthesized as linear combinations of possibly warped versions of the reference images.

The methods that rely on warping have the disadvantage that the depth or disparity maps needed as side information are not always available; their computation usually is not robust and has high computational cost. Besides, the quality of the maps has enormous influence on the performance of the compression method. The present invention, on the other hand, avoids these disadvantages by incorporating the synthetization of depth and color in its model. In summary, the present invention combines the benefits of sparse coding approach with pseudo-video sequence or multi-view coding to explore the inter sub-aperture images redundancy and achieves very competitive results.

SUMMARY

The present invention relates to a method for compressing light-fields by exploiting their overall 4D redundancy using a hybrid approach that combines the benefits of sparse coding approach with pseudo-video sequence or multi-view coding to explore the inter-SAI redundancy and achieves very competitive results. This redundancy is particularly high when the light-fields are densely sampled. Therefore, this invention is especially efficient for densely sampled light-fields, such as the ones acquired by light-field cameras.

The present invention adopts the sparse coding approach because it also discards most of the SAIs sent to the encoder. Additionally, the present invention performs the synthesis also in the encoder side. First, only a sparse set of sub-aperture images, entitled original reference set, is coded and decoded. The decoded reference set is then used to obtain a prediction to the so-called original dismantled set of sub-aperture images. The residual information between the original dismantled set and its prediction is encoded in the bitstream along with the reference set.

In the decoder side, a reconstruction for the light-field is obtained by decoding the reference set and using it to replicate the prediction for the dismantled set. This prediction is then added to the decoded residual information. In this present invention, the residual information of the dismantled set may be encoded with a pseudo-sequence approach or MVC approach by any current or future video codec.

One advantage of the present invention is that the depth maps are generated both at the encoder and decoder sides by a neural-network-based learning system. The depth maps are necessary for the SAI synthesis procedure used in most of the state-of-the-art light-field compression methods, which presents a conspicuous advantage to rendering on the receiver side.

Another advantage is that since this invention uses the residuals as side information, the proposed invention can achieve lower bitrates with higher visual quality performance when compared to other inventions that rely on SAI-synthesis and sparse coding (where disparity/depth maps need to be sent as side information). The reason is that residual signals are often more compressible than other type of signals by having lower entropy.

Moreover, since the present invention preserves the residual differences between synthesized and original SAIs, it tends to produce a decoded light-field with uniform distribution of quality among SAIs and, hence, a better user quality of experience.

BRIEF DESCRIPTION OF THE DRAWINGS

The objectives and advantages of the current invention will become clearer through the following detailed description of the example and non-limitative drawings presented at the end of this document.

DETAILED DESCRIPTION

Figure 1:
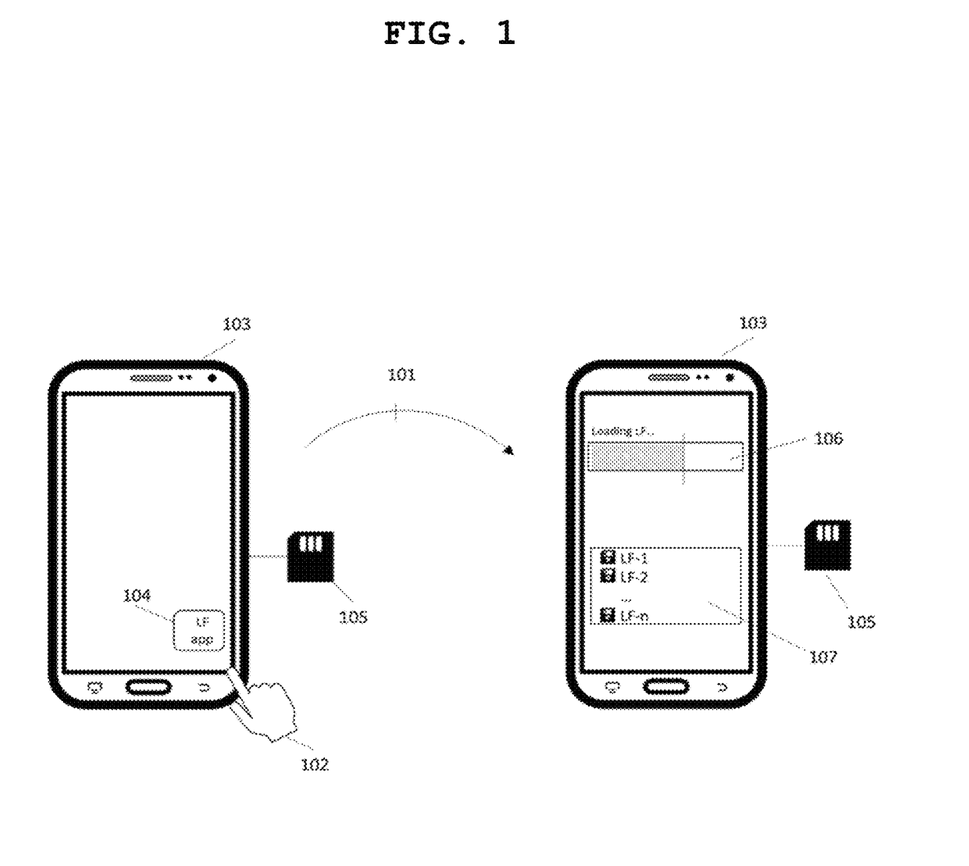
FIG. 1 presents an embodiment of the present invention on a smartphone used to make feasible a light field visualizer application in a mobile device.

FIG. 1 depicts a preferred embodiment of the invention, which consists of a mobile phone with light-field camera on a light-field visualizer. The solid arrow 101 represents the sequence of events within the embodiment execution. The action starts with a user 102 using a smartphone 103, where a system implementing the proposed invention was previously deployed in the form of a light-field application 104. The application encodes the light-field captured by the smartphone camera and the encoded light-field data can be stored in the memory card 105, in the smartphone internal memory, in the cloud, or in another device. The progress of the LF encoding process can be checked by means of a progress bar 106, and the LF is saved in the designated storage area 105, being accessed as a list 107 or icons. The encoding process can be performed locally, without additional processing steps in external or remote machines, despite eventual memory and processing restrictions of the smartphone.

Figure 2:
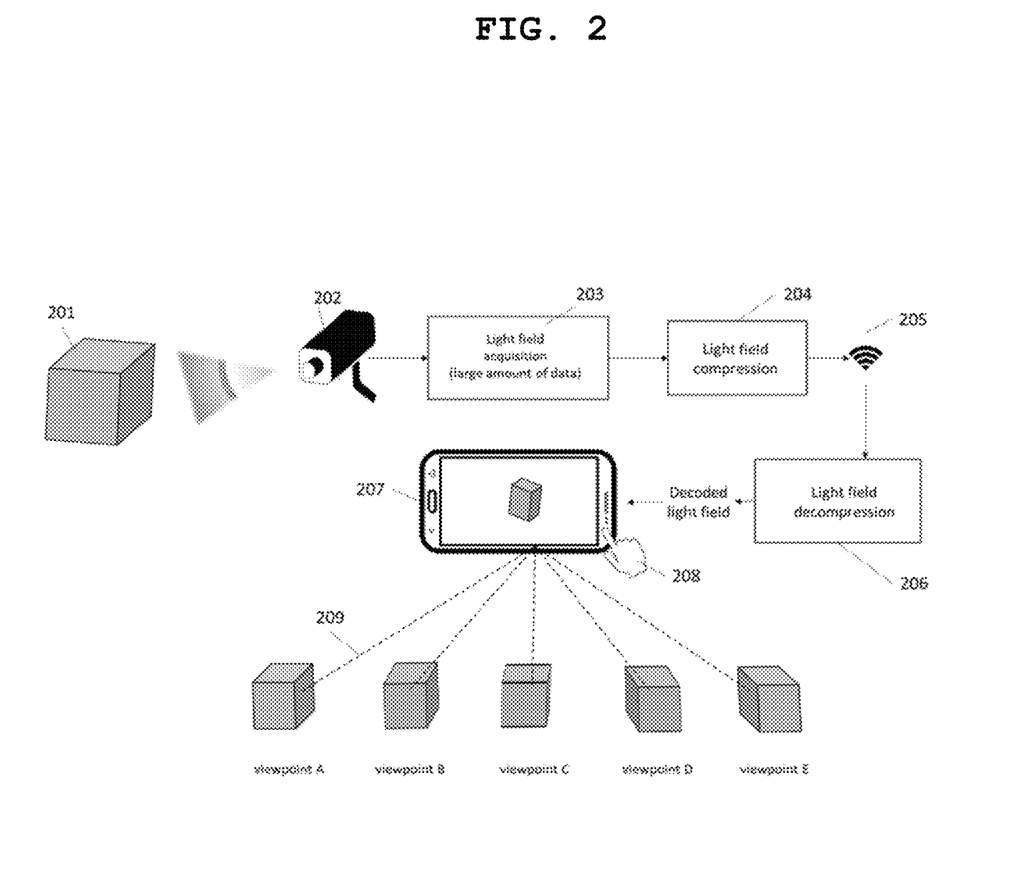
FIG. 2 presents an embodiment of the present invention being used in a light field transmission system.

FIG. 2 shows an alternative embodiment from where the light-field data is transmitted to a light-fields display. While FIG. 1 shows an embodiment where the light-field is previously stored in the same device that exhibits the light-field, FIG. 2 shows the light-field captured, transmitted and then visualized.

In FIG. 2, a 3D object from the real world 201 is captured via a light-field acquirement apparatus 202. The digital representation generated by the camera is a light-field 203. A computing device associated with the camera 202 compresses the light-field 204 using the method proposed in this invention. The compressed representation is suited to be transmitted over a network device 205. In the receiver side, a computing device with the decoder presented in this invention performs the decompression steps to restore the original light-field data 206. The decompressed light-field can be read and rendered in a display 207. Instances of this display can include standard or light-field display devices. The user 208 can interactively change to different viewpoints 209 of the 3D object in the display 207.

Figure 3:
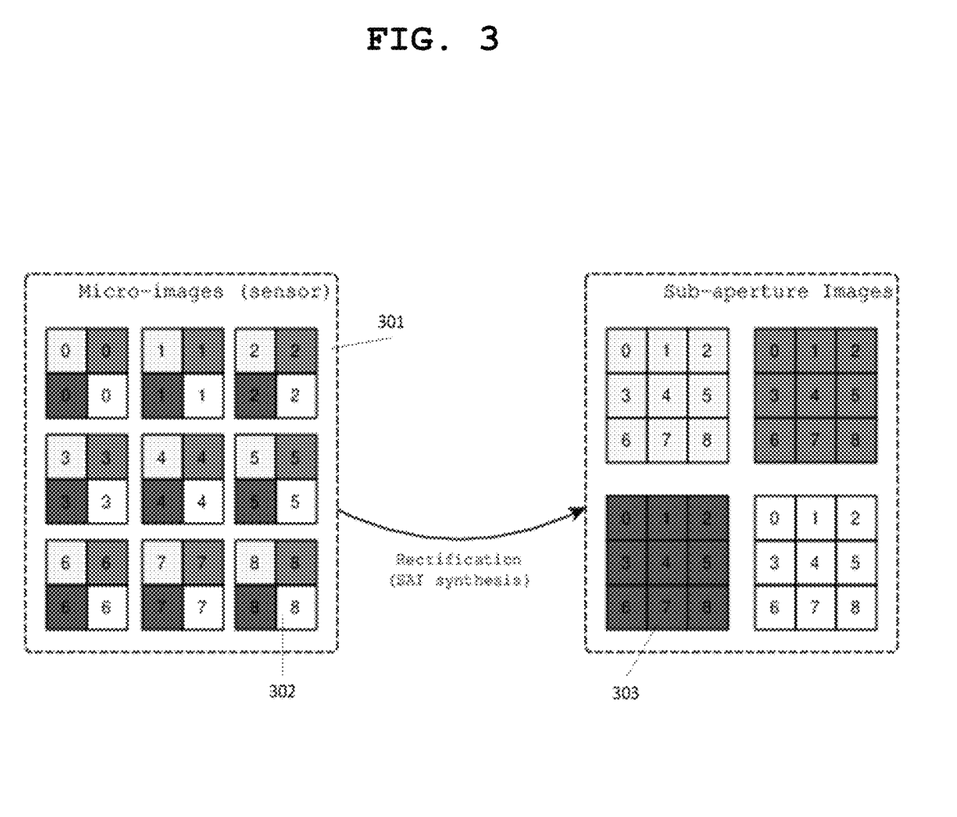
FIG. 3 illustrates a light field rectification procedure that generates sub-aperture images (SAIs) from a single sensor image.

FIG. 3 depicts the light-field data captured by a camera, which is typically represented by a sensor image 301. This sensor image is composed of clusters of pixels called micro-images 302. The micro-images are used to reconstruct the multiple viewpoints of the imaged object using a rectification process. The reconstructed viewpoint corresponds to a SAI (Sub-Aperture Image) 303.

Figure 4:
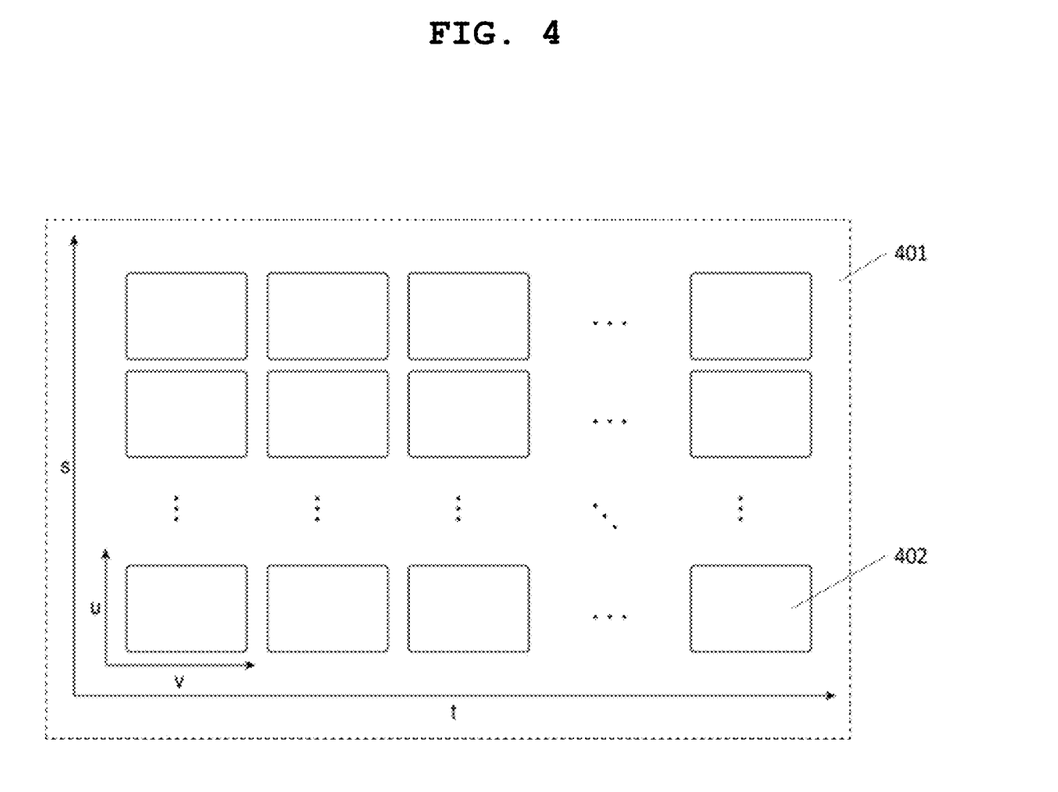
FIG. 4 illustrates a 4D light-field represented as a matrix of sub-aperture images (SAIs).

FIG. 4 depicts the arrangement of SAIs forming the four-dimensional 4D light-field representation used in most real applications, where each pixel can be addressed by a four-dimensional coordinate (txsxuxv). The sub-aperture images are addressed by the (t,$) coordinates pair 401 and the pixels are addressed by the (v,u) pair 402. This 4D representation is, therefore, equivalent to a two-dimensional 2D grid of SAIs.

In typical real-life application, the number of sub-aperture images is large enough to correspond to a huge amount of data. This requires efficient compression schemes, such as the present invention. These compression schemes are classified as micro-image-based compression schemes and sub-aperture-based compression approaches.

The micro-image-based compression approaches exploit the redundancies of the micro-images in order to compress the sensor images. This redundancy elimination can be performed naively with an image codec.

Moreover, the compression structures improve the compression ratio with video codecs, but the massive number of micro-images also restricts the video codec to exploit spatial correlation. Additionally, micro-image-based compression approaches require the transmission of camera parameters for rendering, which increments the data embedded within the final compressed bitstream.

Further to micro-image-based compression schemes, the sub-aperture-based approaches exploit the light-field data redundancy much better since SAIs present a stronger correlation. Because there is a high intra-SAI and inter-SAI redundancy, such correlations can be exploited in order to compress light-fields efficiently.

In this sense, most state-of-the-art solutions for light-field compression are based on the sparse coding approach through the encoding of the reference SAIs followed by the estimation/synthesis of the discarded intermediate SAIs using depth-based image rendering.

The synthesized SAIs are linear combinations of possibly warped versions of the reference images. The methods that rely on warping have the disadvantage that the depth or disparity maps needed as side information are not always available, their computation usually is not robust and has high computational cost. Also, the quality of the maps has enormous influence on the performance of the compression method.

Figure 5:
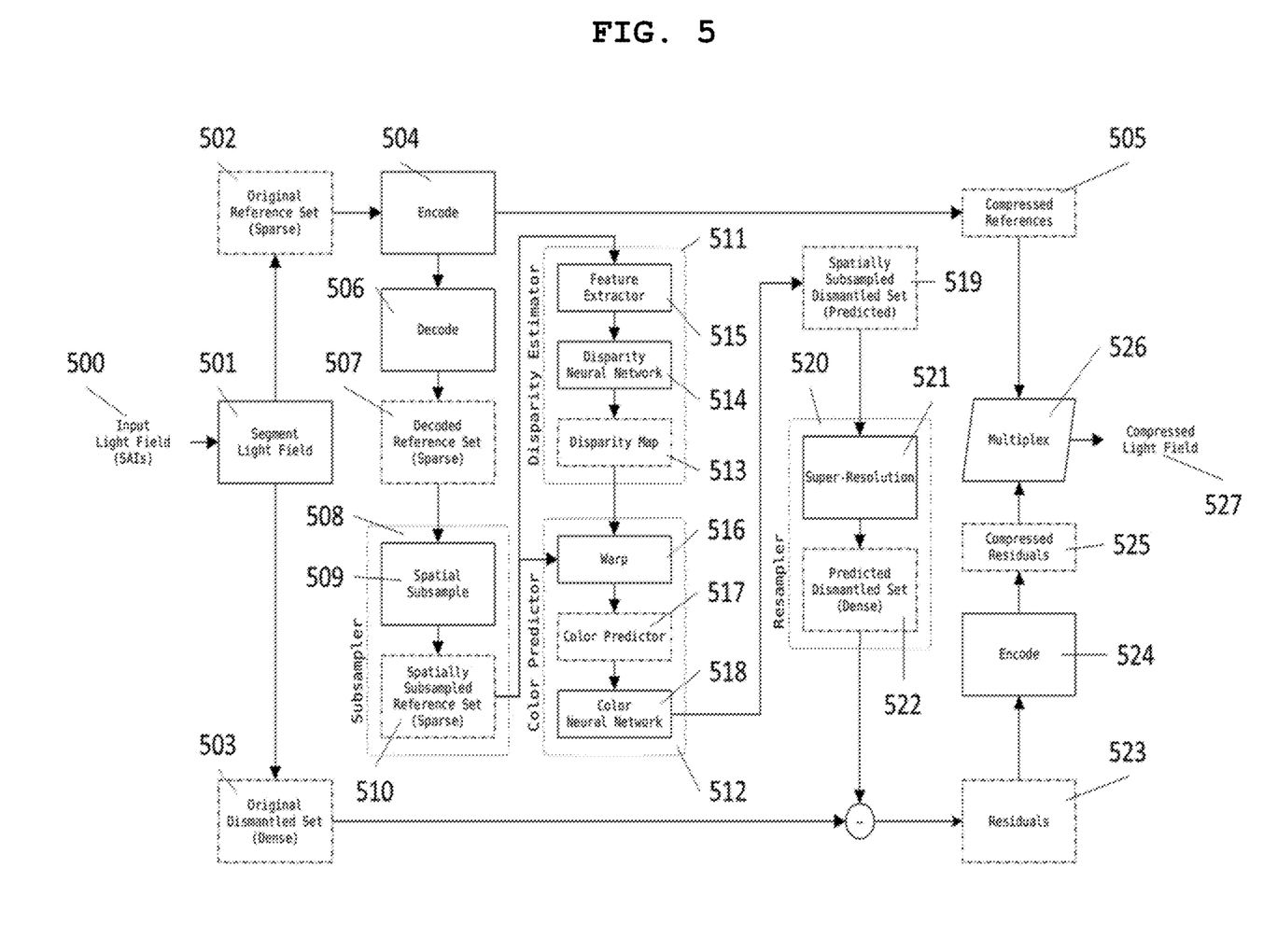
FIG. 5 depicts the block diagram of the encoder.

Moreover, FIG. 5 describes the encoder part of the light-field compression method of the present invention. The four-dimensional light-field data represented as a two-dimensional grid of SAIs is considered as input 500. These SAIs are segmented into two sets 501: original reference set 502 and original dismantled set 503.

The original reference set first follows a common sparse coding approach, i.e., encoding 504 the original reference set 502 using a video or image encoder, which generates a compressed codestream of the reference SAIs 505. Still in the encoder side, the compressed codestream of the reference SAIs is decoded 506 to generate the decoded reference set 507.

The decoded reference set 507 is used as input in the subsampler 508, wherein spatial subsampling 509 operation is performed to reduce the dimensions of each SAI in the reference set 507. This operation generates the spatially subsampled reference set 510, which can present reduced spatial dimensions when compared with the decoded reference set 507.

The subsampler module is only needed when the disparity 511 and color 512 estimators present restrictions on the dimensions of input SAIs. However, if the SAIs in the decoded reference set 507 have no restrictions on the dimensions of input SAIs, the subsampler module 508 can be skipped.

The disparity estimator 511 estimates the disparity for a new SAI. For every pixel in the new SAI, the disparity points to the corresponding pixel in each input SAI. This disparity map 513 is generated using a neural-network-based learning system 514 that estimates the optimal disparity map from the input features extracted from a feature extractor module 515.

The color predictor 512 estimates the SAI color based on information available in the spatially subsampled reference set 510 and the disparity map 513 estimated in the previous stage. The disparity map 513 and the SAIs from spatially subsampled reference set 510 are used to warp 516 novel SAIs using a warping model. These warped SAIs comprise the color predictor 517 that is used as input of a second learning-based module 518 that reconstructs the final SAI. The set formed by all reconstructed SAIs correspond to the spatially subsampled reference set 519.

If the subsampler 508 is used to reduce the dimensions of SAIs, the inverse process must be performed to restore the original dimensions of the light-field. This process is performed by the resampler 520. The resampler 520 applies a super-resolution algorithm 521 to resize the reconstructed SAIs present in the spatially subsampled reference set 519 to the same dimensions of SAIs presented in the original dismantled set 503, which generates the predicted dismantled set 522.

The differences between the predicted dismantled set 522 and the original dismantled set 503 are residuals 523. These residuals are encoded using pseudo-sequence or multi-view approach. The encoder 524 generates the compressed residuals 525 and send them to the multiplexer 526. The multiplexer concatenates the compressed references 505 with the compressed residuals 525 to produce a compressed representation of the light-field 527.

Figure 6:
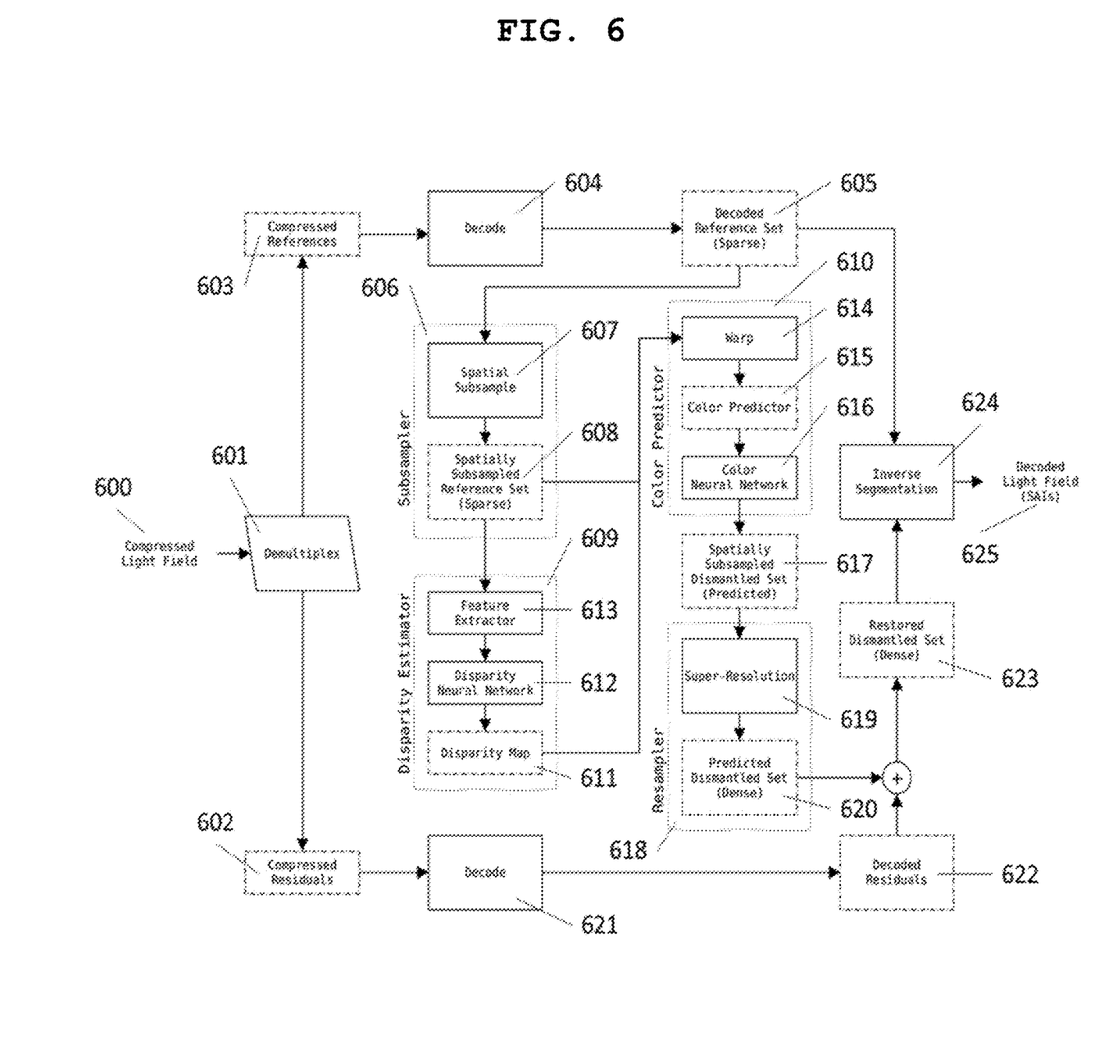
FIG. 6 depicts the block diagram of the decoder.

With the compressed light field 600 as input, light-field decoder performs a subset of steps used in the compression stage as illustrated in FIG. 6. The compressed light-field 600 is sent to the demultiplexer 601 that splits the input into compressed residuals 602 and compressed references 603. The compressed references 603 are decoded 604, generating the decoded reference set 605. This set is used as input in the subsampler 606. The subsampler performs the spatial subsampling 607 operation to adjust the SAI dimensions and produces the spatially subsampled reference set 608.

The next steps are the same performed in the encoder as illustrated in FIG. 5. Specifically, the Spatially Subsampled Reference Set 608 is the input of the Disparity Estimator 609 and Color Predictor 610. The disparity estimator 609 estimates the Disparity Map 611 using a neural network 612 with features extracted 613 from the Spatially Subsampled Reference Set 608. Similarly, the Color Predictor 610 estimates the SAIs using the Spatially Subsampled Reference Set 608 and Disparity Map 611 as input. Using the same stages described in the encoder, the Color Predictor 610 warps the SAIs 614 and then produces the wrapped SAIs 615. These wrapped SAIs are combined via a color neural network 616 to generate the Spatially Subsampled Dismantled Set 617. Finally, the resampler 618 performs a super-resolution 619 to generate the Predicted Dismantled Set 620 in the decoder side.

The Predicted Dismantled Set 620 contains a first approximation of the light-field SAIs that were discarded in the encoder. This approximation is enhanced by the residuals 622. Specifically, the compressed residuals 602 are decoded 621 to generate the Decoded Residuals 622. The sum of the Predicted Dismantled Set 620 with the Decoded Residuals 622 produces the Restored Dismantled Set 623. This set contains all SAIs not present in the Decoded Reference Set 603. The Inverse Segmentation 624 unifies the Decoded Reference Set 603 with Restored Dismantled Set 623 and rearrange the SAIs into their original positions to generate the completely Decoded Light-field 625.

Figure 7:
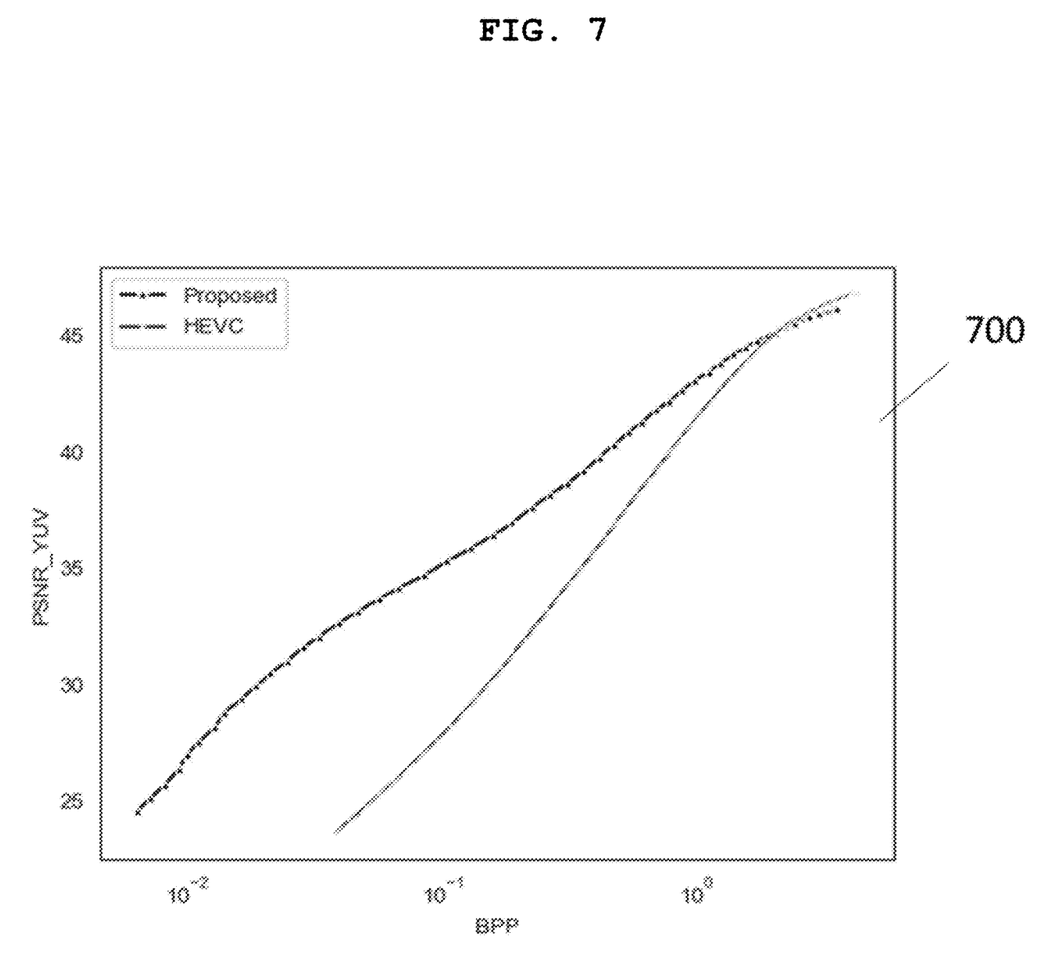
FIGS. 7 to 9 present the results of the present invention for a densely sampled light-field data set in terms of R-D curves.
Figure 8:
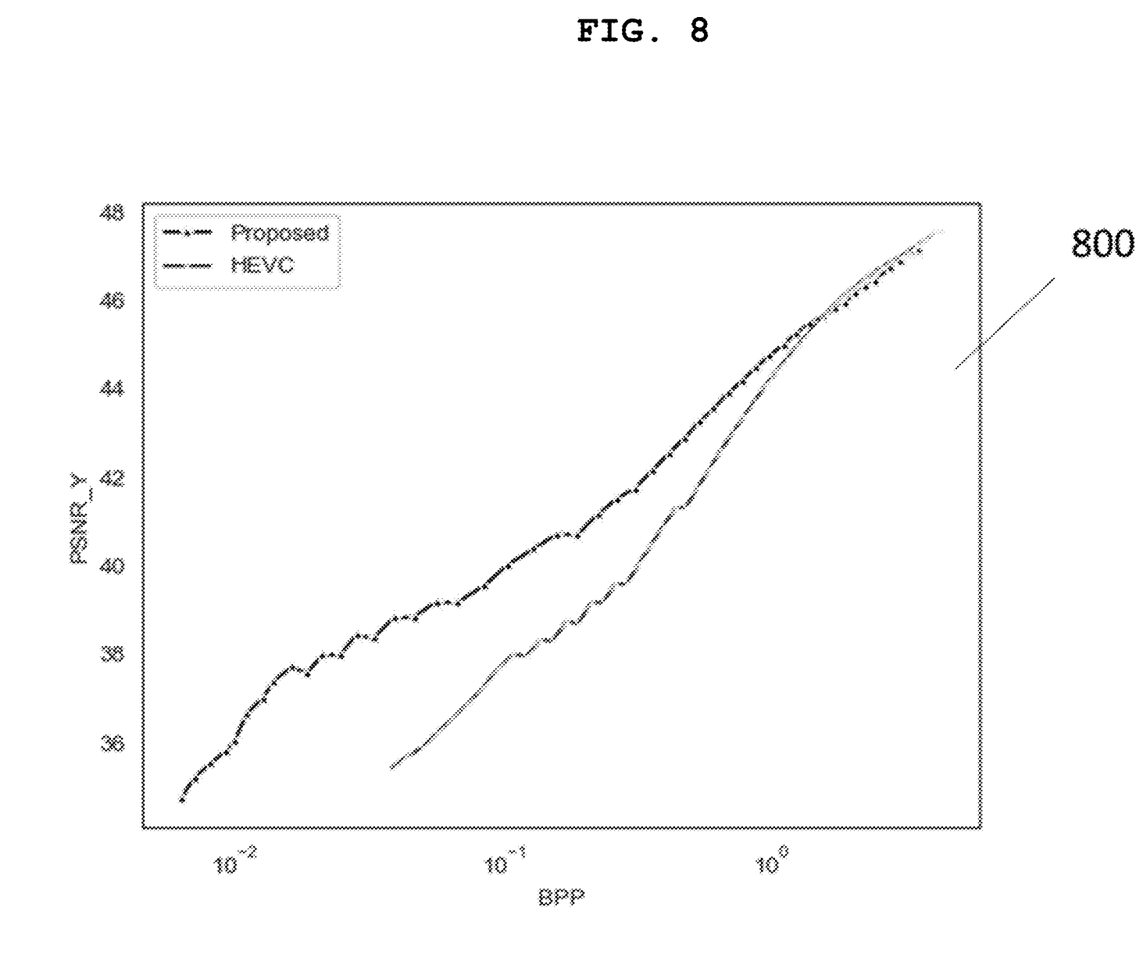
Figure 9:
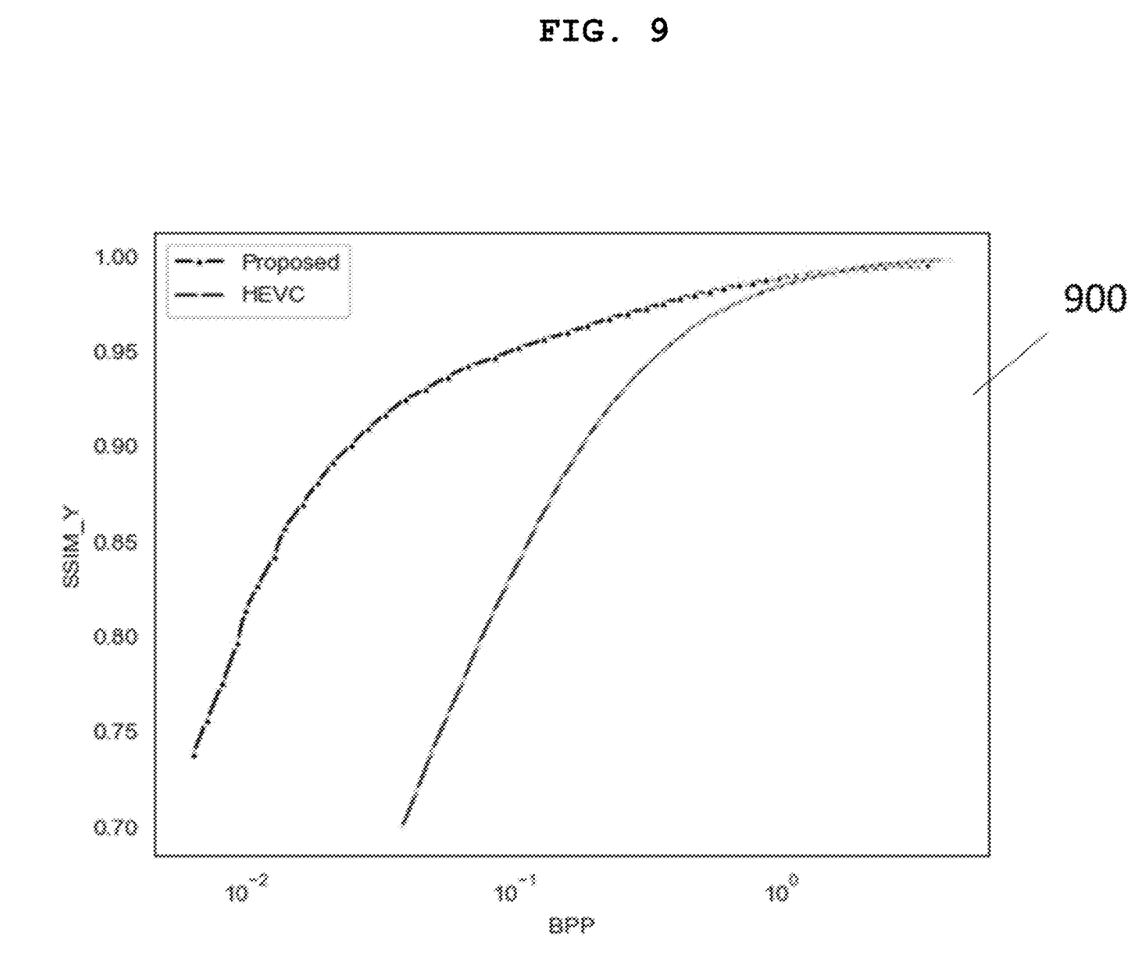

Results are shown in terms of R-D (Rate-Distortion) curves in FIGS. 7, 8 and for a densely sampled light field dataset. These curves show the different quality metrics (PSNR-YUV in 700, PSNR-Y in 800 and SSIM-Y in 900) of the decoded light-field for a number of bitrates (in bits per pixel—bpp). PSNR (Peak Signal-to-Noise Ratio) and SSIM (Structural SIMilarity index) are metrics commonly used to measure the quality of reconstruction of lossy compression codecs. PSNR-YUV assesses the quality reconstruction of all YUV components (color) and SSIM-Y shows the SSIM value for the luminance (Y) component only.

The R-D curves in 700, 800, and 900 show the performance of the tested codecs. For the same point on the x axis, the higher the point on the y axis, the better. In other words, the lower curves indicate worse performance while the superior curves indicate better results. Based on these pictures, it is possible to have an overall idea of the performance of the testing codecs. When analyzing the R-D curves, it can be noticed that the present invention presents the best R-D performance when compared with state-of-the-art HEVC video codecs.

Additionally, the present invention includes at least one example of the numerous possibilities for combining machine learning techniques that can be implemented as an artificial intelligence (AI) module. A function associated with AI can be performed through non-volatile memory, volatile memory and the processor.

The present invention can include a processor or a plurality of processors. In this sense, one or a plurality of processors can be a general purpose processor, such as a central processing unit (CPU), an application processor (AP), a graphics-only processing unit, such as a graphics processing unit (GPU), a visual processing unit (VPU) and/or a dedicated AI processor, such as a neural processing unit (NPU).

In addition, processors control the processing of input data according to a predefined operating rule or by an artificial intelligence (AI) model stored in non-volatile and/or volatile memory. The predefined operating rule or artificial intelligence model is provided through training or learning.

In this case, being provided by means of learning means that, when applying a learning algorithm to a plurality of learning data, a predefined operating rule or AI model of a desired characteristic are performed. Learning can be performed on a device on which artificial intelligence is performed and/or can be implemented through a separate server/system.

The AI model can consist of a plurality of layers of neural network, in which each layer has a plurality of weight values and performs a layer operation by calculating a previous layer and an operation using a plurality of weights. Examples of neural networks include, but are not limited to, convolutional neural network (CNN), deep neural network (DNN), recurrent neural network (RNN), restricted Boltzmann machine (RBM), deep belief network (DBN), neural network bidirectional deep recurrent (BRDNN), opposing generation networks (GAN) and deep Q networks.

The learning algorithm is a technique for training a predetermined target device (for example, a robot) using a plurality of learning data to cause, allow or control the target device to make a determination or prediction. Examples of learning algorithms include, but are not limited to, supervised learning, unsupervised learning, semi-supervised learning or reinforcement learning.

Although the present invention has been described in connection with certain preferred embodiments, it should be understood that it is not intended to limit the invention to those particular embodiments. Instead, it is intended to cover all possible alternatives, modifications and equivalents within the spirit and scope of the invention, as defined by the appended claims.

What is claimed is:

1. A method of compressing light-field data, comprising:
   segmenting input Light Field Sub-Aperture Images (SAIs) into an original reference set and an original dismantled set;
   generating a compressed codestream of references SAIs by encoding the original reference set with a video or image encoder;
   generating a decoded reference set by decoding the compressed codestream of the references SAIs;
   generating a spatially subsampled reference set on a subsampler by performing spatial subsampling in the decoded reference set;
   estimating a disparity map for a new SAI in a disparity estimator;
   generating a spatially subsampled dismantled set by estimating, in a color estimator, SAI color based on information available in the spatially subsampled reference set and the disparity map;
   generating, by an encoder, compressed residuals and sending the compressed residuals to a multiplexer;
   concatenating the compressed references SAIs with the compressed residuals; and
   producing a compressed representation of the light-field data.

2. The method according to claim 1, wherein when the SAIs in the decoded reference set have no restrictions on dimensions of the input Light Field SAIs, the generating of the spatially subsample reference set on the subsampler is skipped.

3. The method according to claim 1, when using the subsampler for the generating of the spatially subsample reference set on, the method further comprises:
   generating a predicted dismantled set with a resampler applying a super-resolution to resize reconstructed SAIs present in the spatially subsampled reference set to the same dimensions of SAIs presented in the original dismantled set.

4. The method according to claim 1, wherein the disparity map is generated using a neural-network-based learning system that estimates optimal disparity map from input features extracted from a feature extractor module.

5. The method according to claim 1, wherein the disparity map and the SAIs from the spatially subsampled reference set are used to warp novel SAIs using a warping.

6. The method according to claim 5, wherein the novel warped SAIs comprise a color predictor that is used as input of a learning-based module that reconstructs a final SAI corresponding to the spatially subsampled reference set.

7. The method according to claim 1, wherein the decoding is performed by a decoder and the method comprises:
   demultiplexing a compressed light-field, splitting the compressed light-field into compressed residuals and compressed references;
   decoding, by the decoder, the compressed references, generating the decoded reference set;
   performing, by the subsampler, a spatial subsampling operation to adjust SAI dimensions and producing the spatially subsampled reference set;
   estimating, by the disparity estimator, the disparity map using a neural network with features extracted from the spatially subsampled reference set;
   estimating, by a color predictor, the SAIs using the spatially subsampled reference set and disparity map as input;

warping, by the color predictor, the SAIs;
combining the warped SAIs via a neural network to generate the spatially subsampled reference set;
performing, by a resampler a super-resolution to generate the predicted dismantled set in the decoder side;
decoding the compressed residuals and generating the decoded residuals;
summing the predicted dismantled set with the decoded residuals and producing the restored dismantled set;
unifying, by inverse segmentation, the decoded reference set with restored dismantled set; and
rearranging the SAIs into respective original positions and generating a completely decoded light-field data.

* * * * *